United States Patent [19]
Benjamin

[11] Patent Number: 6,163,591
[45] Date of Patent: Dec. 19, 2000

[54] SCREENING APPARATUS AND METHOD

[75] Inventor: Ralph Benjamin, Rockwell Park, United Kingdom

[73] Assignee: The Imperial College of Science, London, United Kingdom

[21] Appl. No.: 09/214,905

[22] PCT Filed: Jul. 17, 1997

[86] PCT No.: PCT/GB97/01921

§ 371 Date: May 27, 1999

§ 102(e) Date: May 27, 1999

[87] PCT Pub. No.: WO98/03888

PCT Pub. Date: Jan. 29, 1998

[30] Foreign Application Priority Data

Jul. 18, 1996 [GB] United Kingdom .................... 9615132

[51] Int. Cl.[7] ...................................................... G01N 23/02
[52] U.S. Cl. .................................. 378/57; 378/54; 378/89
[58] Field of Search ................................. 378/51, 53, 54, 378/57, 86, 89, 90; 250/339.12, 339.06

[56] References Cited

U.S. PATENT DOCUMENTS

| | | | |
|---|---|---|---|
| 5,182,764 | 1/1993 | Peschmann et al. | 378/57 |
| 5,261,931 | 11/1993 | Wright | 95/3 |
| 5,442,672 | 8/1995 | Bjorkholm et al. | 378/4 |
| 5,642,393 | 6/1997 | Krug et al. | 378/57 |

FOREIGN PATENT DOCUMENTS

| | | |
|---|---|---|
| 0 193 786 | 9/1986 | European Pat. Off. . |
| 0 261 984 | 3/1988 | European Pat. Off. . |
| 0 485 872 | 5/1992 | European Pat. Off. . |
| 41 37 510 | 5/1993 | Germany . |
| 2 287 164 | 9/1995 | United Kingdom . |
| WO 93 09512 | 5/1993 | WIPO . |
| WO 97/12230 | 4/1997 | WIPO . |

OTHER PUBLICATIONS

Conference Paper "Automatic X-Ray Screening of Aircraft Hold Luggage", R. Benjamin et al, Apr. 1997.

*Primary Examiner*—David V. Bruce
*Assistant Examiner*—Drew A. Dunn
*Attorney, Agent, or Firm*—Nixon & Vanderhye P.C.

[57] ABSTRACT

A screening system for screening items, such as aircraft-hold luggage, uses a conveyer system for carrying the items along a path and an array of sensors spaced along and around the path for determining the opacity to radiation in planes intersecting the path and the items. A signal processor uses signals from the sensors to detect contours of maximum local rate of change in opacity and from these reconstruct boundaries between the regions having different opacity to radiation and then determines whether or not one or more predetermined screening criteria are met.

15 Claims, 3 Drawing Sheets

FIG. 6           S=SENSOR

FIG. 11

SCREENING APPARATUS AND METHOD

BACKGROUND OF THE INVENTION

This invention relates to a screening apparatus and method of the type that may, for example, be used to screen aircraft-hold luggage for concealed weapons or explosive devices.

It is known from International Published Patent Application WO-A-9309512 to provide an object-based 3D X-ray imaging technique that based upon the principal of imaging objects/regions within an item by detecting discontinuities in the opacity to the transmission of X-rays from different directions surrounding the item. This technique is based upon taking approximately ten views through the item with those views being uniformly distributed in solid angle.

Whilst the above mentioned imaging technique is capable of imaging weapons within aircraft-hold luggage, it suffers from the disadvantage that the uniform distribution in solid angle of the views requires an extremely bulky device to operate upon luggage sized items and would be ill-suited to anything other than piecewise operation.

European Published Patent Application EP-A-0,485,872 discloses a baggage security screening system including a portion that contains several X-ray sources and line detectors for detecting the opacity to radiation in a series of planes intersecting an object under test. The signals detected are processed to produce an opacity map of the object.

BRIEF SUMMARY OF THE INVENTION

Viewed from one aspect the present invention provides apparatus for screening an item to detect regions within said item having different opacity to radiation, said apparatus comprising:

a conveyor system for carrying said item along a path; and an array of sensors, each sensor comprising a radiation source and a radiation detector disposed upon opposite sides of said path and serving to generate transmission signals indicative of opacity to radiation between said radiation source and said radiation detector in a plane intersecting said path, said sensors being disposed at a plurality of different locations along said path and being arranged to irradiate said item from a plurality of different angular orientations about said path; characterised by a signal processor for processing said transmission signals from said array of sensors to detect contours of maximum local rate of change in opacity within a plane through said item to generate cross section signals indicative any boundaries in said plane between said regions having different opacity to radiation and responsive to said cross section signals for a plurality of planes through a region to detect if said region matches one or more predetermined screening criteria.

The invention recognizes that an imaging technique based upon the detection of contours or maximum local rate of change in opacity to the transmission of radiation need not provide the maximum 3D imaging resolution and yet still be able to spot potential security hazards and adopt a sensor arrangement more suited for continuous operation with a large number of items to be screened.

Whilst the invention could use shape recognition algorithms as the predetermined screening criteria (e.g. to detect handguns), it is preferred that said predetermined screening criteria is whether said regions is of material having an opacity to radiation with a predetermined characteristic, said signal processor using said cross section signals in combination with said transmission signals to determine said opacity to radiation of said region.

It has been found that the opacity to radiation is characteristic of the material through which the radiation is travelling and accordingly this technique makes it possible to screen for explosives largely irrespective of the shape into which they are formed.

This capacity is further enhanced in embodiments in which at least one of said radiation sources generates radiation at at least two frequencies and said predetermined characteristic is a relative opacity at at least two frequencies of said radiation falling within a predetermined range of relative opacities.

Whilst the absolute value of the opacity may be subject to error depending upon the precise location of the region being investigated within the item and the nature of the surrounding regions within the item, it has been found that the relative opacity at two different radiation frequencies provides an accurate identification of the material of the region.

The determination of the opacity of the material of a region is enhanced as the invention is able to determine the 3D shape of the region and so calculate a penetration depth of a particular ray through the material under investigation and so compensate for absorbtion in surrounding regions. If R distinct regions are intersected by this line, the opacity of no one region can be determined in isolation: R distinct lines of this type arre required to determine the opacity of all R regions.

Multiple measurements of opacity can be made and then those falling outside a predetermined limit from the others discarded as this variation is quite likely to be due to a topological error in shape determination. This may cause the length of path of a given source-to-sensor ray to be incorrectly apportioned between the variuos regions penetrated by it. When the erroneous measurements have been discarded the remainder can be averaged.

It may be convenient to arrange the majority of the sensors such that they image planes orthogonal to the direction of movement on the conveyer system. Alternatively, the viewing axes of the fan-beanm sources may be quasi-uniformly distributed in two-dimensional angular space, permitting superior derivation of the 3D regional boundaries, albeit at the expense of a somewhat more complex system configuration and more complex processing.

In order to enhance the ability to investigate thin sheets of material that may happen to be oriented such that the main sensors cannot produce an accurate determination, it is preferred that at least two additional sensors are disposed to irradiate said item in a plane non-orthogonal to said path of said item along said conveyer system.

If the conveyer system comprises a plurality of rollers, then the sensors may be conveniently disposed between the rollers.

The invention may be utilised to screen many different sorts of item, but it is particularly well suited for the screening of aircraft-hold luggage and for screening to identify explosives within that luggage.

The radiation source used could theoretically have various forms, but is preferably X-ray radiation.

Embodiments of the invention are able to utilise relatively inexpensive line detectors as the radiation detectors so reducing the overall cost of the screening system.

Viewed from another aspect the invention provides a method of screening an item to detect regions within said item having different opacity to radiation, said method comprising the steps of:

carrying said item along a path; and generating transmission signals with an array of sensors, each sensor comprising a radiation source and a radiation detector disposed upon opposite sides of said path and serving to generate transmission signals indicative of opacity to radiation between said radiation source and said radiation detector in a plane intersecting said path, said sensors being disposed at a plurality of different locations along said path and being arranged to irradiate said item from a plurality of different angular orientations about said path; characterised by processing said transmission signals from said array of sensors to detect contours of maximum local rate of change in opacity within a plane through said item to generate cross section signals indicative any boundaries in said plane between said regions having different opacity to radiation and responsive to said cross section signals for a plurality of planes through a region to detect if said region matches one or more predetermined screening criteria.

BRIEF DESCRIPTION OF THE DRAWINGS

An embodiment of the invention will now be described, by way of example only, with reference to the accompanying drawings in which.

DETAILED DESCRIPTION OF THE INVENTION

Do we need Object 3D?

The "object-3D" technique (as described in WO-A-9309512) of object-based 3D X-ray imaging, developed at Imperial College is better than necessary for screening cabin luggage; full 3D reconstruction, based on about 10 views distributed uniformly in solid angle, is not needed. Three orthogonal views should be quite sufficient to reveal the shape of any weapon. The main need is for aspect-independent shape-recognition algorithms which would recognise all potentially-relevant weapons.

Object-3D is also better than necessary for screening hold luggage; in this application, 3D reconstruction needs only to be good enough to permit density determination, for the identification of substances.

In neither application do we need real-time interactive image manipulation, and hence we do not need to convert an analytic representation of the surfaces into near-equivalent triangular facets.

Figure 1:
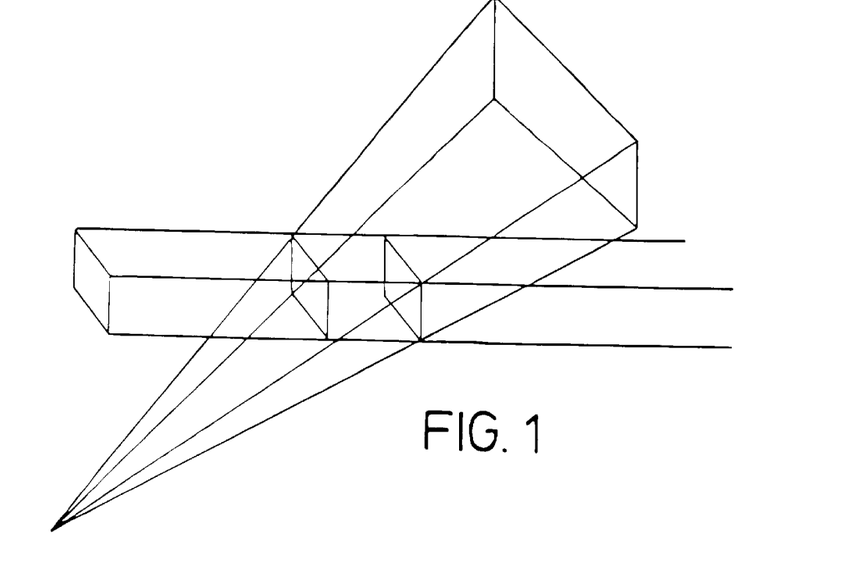
FIG. 1 shows a one source and 2D sensor array for a "Object-3D" solution.

In both applications the constraints of operating outside a continuous-flow luggage-handling "tunnel" would preclude the use of a single source and 2D sensor array, positioned by a two-axis rotating arm system. In place of this any object-3D configuration would require approximately 10 separate fixed sources and 10 extra-large 2D sensor arrays. See FIG. 1. The total assembly would occupy a volume of at least three times the diameter of the tunnel itself, even if the image plane is tilted towards the tunnel. Furthermore, it would be difficult and expensive to make the local section of the moving belt mechanism compatible with the sensing system.

The 2D sensor arrays would have to be many times larger than any 2D array currently in use. Although this requirement could be satisfied primarily by increasing the size of the sensor pixels without necessarily increasing their number, this would almost certainly require some expensive specific development, and it would probably result in a very expensive final system.

On the other hand, as in the medical application, object-3D should be excellently matched to the detailed interactive examination of a suspect item, within a given diagnostically significant sub-volume, subsequent to the primary mass-screening function.

Is CT a Viable Alternative?

Radiation Dosage

Since CT is pixel based, it needs of the order of 1000 views, each comprising a distinct 1000 point line view, to generate a high resolution (1000×1000 pixel) slice image. Moreover, the requirement to resolve around 1000 independent pixels in each "ray" entails the requirement for very high signal/noise ratios and hence very high source levels in each of these 1000 views. These very high radiation doses carry with them the requirement for very substantial and expensive screening. They also entail source levels which are expensive and difficult to generate, even with rotary-target, fluid-cooled X-ray tubes. Above all, the irradiation levels involved are unlikely to be acceptable to the owners of the luggage.

Physical Configuration

At the assumed belt speed of 500 mm/s, an axial resolution of 1 mm would require a helical-scan CT system to rotate at 500 revs/s (30000 r.p.m), i.e. an ω of 3140. At a radius of 1 m, this would correspond to a centrifugal acceleration of $10^6$G: hardly feasible. However, the progressive movement of the luggage along the belt should make is possible to distribute the sensing function amongst an number of planes normal to the direction of travel, with a number of fixed sources and line arrays in each plane. Indeed, with a rather expensive specialised X-ray tube, the electron-beam could be electrically switched between a number of closely spaced target positions, and an appropriate, somewhat extended line-sensor array could be time-shared between these sources.

Figure 2:
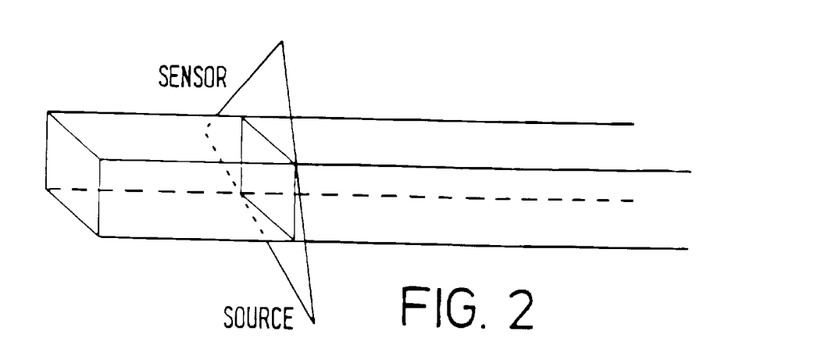
FIG. 2 shows a one source, line-sensor and slice of tunnel irradiated for a CT (or new-type) solution.
Figure 3:
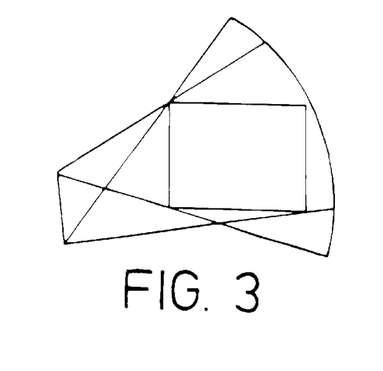
FIG. 3 shows time-shared source positions and sensor array with limiting and intermediate source positions for a CT solution.
Figure 4:
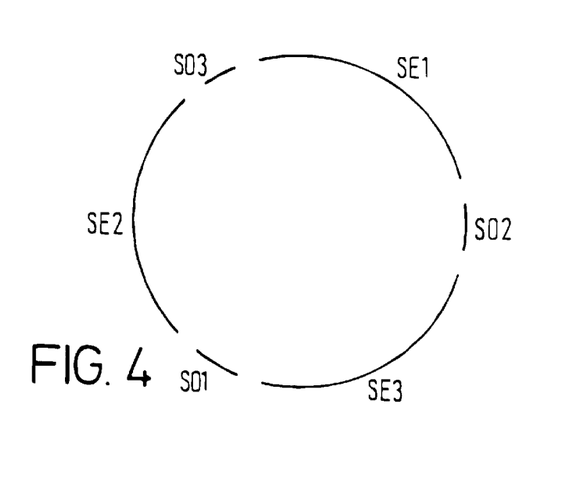
FIG. 4 shows three interleaved 20° CT source systems (SO) and their sensors (SE)

Since a source might have to be positioned at or close to a corner of the tunnel, its fan angle will have to be rather less than 90°. Let us assume it will be 70°. Consider an X-ray tube capable of catering for 60 source positions uniformly spread over 20°, using such a 70° fan-beam angle per source. The lead mask would then limit the fan beam to 90°, of which only 70° at a time would be used. Similarly the sensor array would cover a 90° circular arc (or comprise several straight line segments approximating to that circular arc), of which only 70° at a time would be used. See FIG. 2. The source and sensor jointly would account for 110° of the circumference, and hence three such systems could be accommodated in one plane giving a joint coverage of 60°. See FIG. 3. Hence a total of 6 such planes would be required, probably accommodated between successive rollers of the roller track underneath the continuously moving belt. Thus the total angular extent of sensors would be "only" 6×3× 110°=5.5×360°, but these sensors would have to accommodate quite sophisticated time sharing. Furthermore, 18 very complex and advanced, very high power, 60 way switched X-ray tubes would be required.

One potentially serious reservation is that most of the sensors would have to accept X-rays arriving over a 20° range of fan angles. Although this tolerance is restricted to the X/Y plane of the fan, it is not certain that it would provide sufficient immunity to side-scattered X-rays to yield the high signal/noise ratio (contrast) required for CT processing. Hence it may in practice not prove possible to achieve as much sensor sharing and multiple-target common X-ray tube operation as postulated above.

Thus we conclude that:

CT would need drastic adaptation, e.g. as outlined above, for holding luggage screening;

The very high radiation dosage of high resolution CT is unlikely to be acceptable in this mass-screening application;

Any CT solution would need a considerable number of very complex and expensive specialised, yet to be developed, X-ray tubes;

It is uncertain whether this solution would yield the contrast (signal/noise ratio) required for CT processing. In the limit, a much larger number of single view sources and sensors might therefore have to be provided, resulting a large increase in the physical length and in the already very high financial cost of any CT solution.

Basis of the Proposed Technique

Hence it is now proposed to employ some of the concepts, techniques and skills developed on the context "object-3D", together with some of the ideas developed above for adapting CT to luggage screening and some entirely new ideas, in a radically different approach to the X-ray screening of hold-luggage. This entails a physical configuration similar to a drastically scaled-down version of the novel CT scheme, proposed and discusses above for this application, together with a processing scheme adapted from that developed at Imperial College for "object-based 3D X-ray imaging" ("Object-3D").

The basic sensor system, for this purpose, would comprise, say, 15 fan-beam X-ray sources and line arrays, similar to those currently used for airport cabin-luggage screening, but distributed uniformly in 1D angular orientation. (The choice of the number of fans is discussed more fully in a later section). For much the same reasons as those discussed above in the context of the CT, it is not feasible to use a spiral-scan mechanism to time-share the 15 viewing directions via a single rotating source/sensor pair. Hence, as in our solution to CT, all the fans would be fixed in the X/Y plane, orthogonal to the Z direction of travel of the belt, but they might be accommodated, in 5 groups of three sources each (with a common sensor), in 5 consecutive inter-roller gaps of the belt-transport mechanism.

Figure 5:
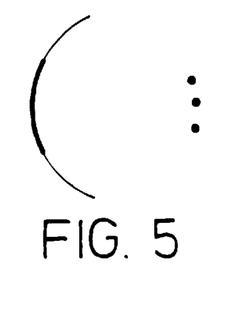
FIG. 5 shows a triplet of source positions and partially-common sensor array.

The viewing axes of our postulated 15 sources would be separated by 360°/15=24°. Assume that the sensor array facing source n is curved in a circular, arc centred on that source, or else comprises several straight line segments approximating to that circular arc, so that all sensor elements look (near enough) towards the source n. Hence radiation from the two flanking sources, (n−1) and (n+1) will only differ by 24° from this viewing direction. So, subject to extending the array from, say 70° to 70+(2×24)=118°, see FIG. 5, this sensor array could be time-shared between the three consecutively-excited sources, (n−1), n and (n+1). These would probably be independent separate sources. (A single special X-ray tube, whose electron beam is switched electronically between three target locations, is probably not cost effective.) Since each such triplet would account for 3 of our 15 viewing axes, spaced by 24°, five identical such triplets rotated 72° one to the next, could be accommodated in consecutive inter-roller gaps to cover 360°.

As discussed below, the source fan angles might be 70°, and the sensor could be curved or composed of, say, three straight lines, so as to be approximately normal to the incident rays. Even then, the outer envelope of the system would be a cylinder of about 2.25 m diameter.

Some reduction of this diameter could be achieved, by recognising that most of the objects to be examined will arise in the lower portion of the tunnel, and also that their lateral position is more likely to be reasonably central than hard up against the tunnel wall. Hence it may well be acceptable to degrade the coverage to the top right and left hand corners of the tunnel by moving the laterally offset sources closer in and lower down, and lowering the position of the topmost sources. Objects in one of the top corners of the tunnel might then miss four tangent lines in their top corner: one each from the two fans whose viewing direction are roughly orthogonal to the relevant tunnel walls and one each from the two fans whose viewing direction are roughly orthogonal to the diagonal through that corner (from opposite directions).

It takes only two parallel lead plates to screen the whole curved line-sensor array from any side-scatter outside the plane of its three fans and so the Z-axis separation between these 5 fan triplets should eliminate any triplet-to-triplet side-scatter interference. Since the three fans within a triplet are separated in the time domain by consecutive operation, there will also be no mutual side-scatter interference between them. Thus we are only concerned with side-scatter within a single fan. As explained below, the nature of the image processing in our scheme renders it relatively undemanding in respect of contrast.

Figure 6:
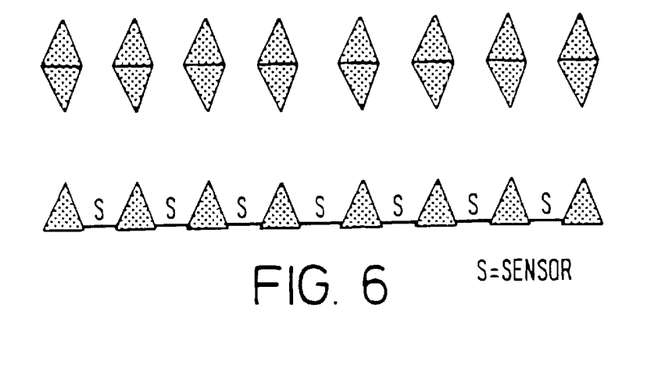
FIG. 6 shows coplanar plus spaced screens accepting radiation at −24°,0° and +24° only.

Assuming that even this is potentially troublesome, we note that the right and left outer 24° segments of each 118° array would serve only one source each. Hence a lead screen in front of the sensors could readily be penetrated, at each sensor element, by a hole in line with the direction joining that element to the corresponding source. For the next inner right and left 24° segments of the line array, each element will, at different times, be associated with either of two sources, and hence needs two appropriately directed holes through its lead screen. See FIG. 5. Similarly, for the innermost 22° each element will, at different times, be associated with three sources, and hence needs three appropriately directed holes through its lead screen. Thus, at worst, side-scatter could be received via two narrow holes, say 2° diameter, i.e. 0.001 steradian each, out of a total potentially relevant solid angle of say 1 steradian. It would thus be completely negligible. FIG. 6 shows how we can admit the three wanted directions of radiation but no others, using two appropriately separated screens. It shows that the price paid for three-fold sharing of a predominantly common sensor array is then a reduction in aperture efficiency (from, say, 80%) to 50%. Since we are dealing with a line array, the side-walls of the screen do not obstruct any wanted radiation. If need be, the screen could be vibrated, for gapless cover of the line-sensor, without affecting this aperture efficiency.

The number of fan views taken for CT would be about 1/60 of that required for a high-resolution CT system, and the X-ray intensity in each of these fan views would be at most 1/10 of that required for CT. The radiation dosage for our scheme would still be some 15 times more than that used in normal cabin-luggage inspection. Nevertheless it could probably be made film-safe and should be acceptable to the user and to the general public for the routine luggage screening.

Object Reconstruction

As the luggage travels along the conveyor past the fans, each fan will generate an occluding outline of each object, unique to this fan's viewing direction. See FIG. 5. In the context of "object-3D" Imperial College has already achieved significant advances in:

Segmentation techniques for identifying closed contours;

Edge extraction methods and edge-linking techniques for optimally defining the boundaries of these closed contours;

Techniques for linking the different views of the same object, for identification of that object, by the common position of their leading and trailing endpoints, in the Z-direction of conveyor travel. (Indeed all pairings of views will generate common 3D locations for the Z-direction endpoints of the given object).

Thus the full 3D information on the shape and density profile of the object is invoked, and used fully, to determine the best reconstruction of the projected occluding outline of the object, as seen from the direction of the relevant source. "Internal edges", i.e. loci of discontinuity in the projected aggregate density inside the occluding outline are also noted, but they are put into "cold storage" at this stage.

In each discriminable Z position, between the Z-axis end-points of a given object, any given projected outline views will thus define 2 points. For each of these 2 projected points we then compute the line joining it to the source position. This defines a locus line, tangential to the given object in the X/Y plane for the given Z value. Hence the 15 views jointly define 30 such tangent lines, which jointly constitute a polygonal approximation to the true occluding outline of the object in the given Z-axis position. There will be multiple intersections of these locus lines, but the occluding polygon is uniquely and simply defined by the innermost set of lines. See FIG. 6.

Smoothly curved regions in that polygon are then estimated by fitting a B-spline or other appropriate polynomial tangential to the mid-points of the sides of that polygon, using the B-spline fitting techniques developed for "object 3D". Any sharp corner or edge in the object, where the tangent angle changes by more than about 12° (i.e. 360°/30) will be marked by the intersection of two or more tangent lines. In other words, one or more sides of the polygon will then shrink to zero. These corners will therefore be automatically included in the above curve-fitting algorithm. Thus the position or corners will be accurately defined in 3D, but the precise shape of smoothly curved regions has to be inferred from their polygonal approximation.

Figure 7:
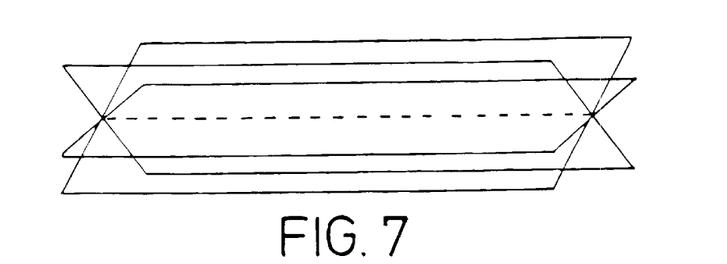
FIG. 7 shows three rotationally displaced viewing planes generating distinct occluding outlines

Indentations, excrescences and other complications of shape would generate the additional "internal edges" of the object which we put into "cold storage" above. Consider a simple concave indentation from the occluded outline. Its internal edge will generate an additional set of tangent loci. This will be equivalent to a section of a distinct monotonically curved convex object, and so its tangent lines, too, will have an average spacing of 360°/30=12°. See FIG. 7. Hence its shape is determined by the innermost sequence of these locus lines, describing the concavity. Some smoothing may then be applied to the transition between the concavity and the main occluding outline.

More complex shapes can be broken down into monotonically curved segments, and hence these will similarly have tangent lines spaced by average of 12°. The number of tangent lines will merely be increased accordingly but the problem of defining the break-down of the total shape into its monotonically-curved segments is increased disproportionately and this is currently the subject of further study.

Figure 8:
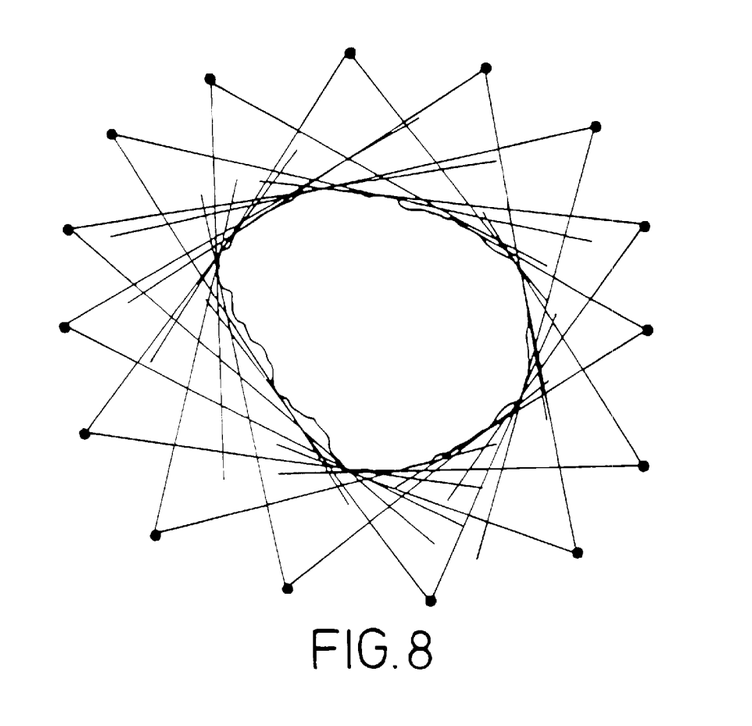
FIG. 8 shows a simple object and its tangent lines from fifteen equally-spaced source positions.

For a round object in the centre of the tunnel, the right hand tangent directions from the 15 sources will each differ uniformly by 360°/15=24° one from the next, and so will the 15 left hand tangents. If the angle subtended by the object at the sources is an odd multiple of 12°, the two sets of 15 tangents are perfectly uniformly interleaved, with identical spacings of 12°. In general, of course, the objects are not perfectly round, nor centrally placed in the tunnel, nor do they subtend precisely an odd multiple of 12° at the sources. Hence we still have an average external angle of 12° in the defining polygon, but with significant variations from one corner to the next. See FIG. 8. However, on the basis of the limited paper experiments, we expect that the proposed total of 15 viewing directions will allow sufficient margin for these variations to permit the shapes of all relevant objects to be adequately derived from the resulting polygons.

Discussion of Object Reconstruction In "object 3D", with n viewing axes distributed uniformly in solid angle, each of $n(n-1)/2$ pairings of views generates a minimum of two distinct precisely-defined 3D points, distributed uniformly over the object's surface. By contrast, in the system here discussed, the viewing axes are distributed in a single plane. The $n(n-1)/2$ pairings of views then still generate the precise 3D location of two points each, but they all are the same z-axis end-points of the object! This redundant waste of potential information is the price we pay for the economy in hardware and in space usage.

The reconstruction of complex shapes will then pose some novel problem. It is simpler than in "object 3D" in so far as the problem arises only within 2D slices; but more complicated in so far as the input information comprises only tangent lines and except for any sharp corners does not include the explicit precise positions of any points.

Given correct 2D cross sections, 3D reconstruction, even of quite complex objects, will be taken care of by continuity and correlation in the Z direction, using well established techniques for building up solid shapes from a stack of crosssectional slices. Thus, in this respect, we have an easier problem than direct 3D object reconstruction. Indeed, there is a scope for using this continuity in the Z-direction so that simple cross sections (or other cross sections reconstructed with high confidence) can guide the 2D reconstruction of nearby more complex ones. However, as shown below, we do not in fact depend on an accurate 3D reconstruction of all the features of complex objects.

Objects which are too small in volume and/or too complex in shape to constitute potential explosive charges may be recognised as such, and then may not need reconstruction at all. This does entail the risk that a density reconstruction ray passes through such an object and hence produces an erroneous result. However, such erroneous results can be recognised and eliminated from our redundant set of density samples, as explained in section F below.

The computation for object reconstruction should be rather different, but somewhat less demanding than for object-3D:

B-spline cross-section outlines derived from tangent-line polygons, 3D shapes derived from a continuous stack of such cross-sections, in place of:

identification and 3D location of common points, 3-line approximations to outline segments between such 3D points, generation of surface net, derivation of sets of triangular facets representing the surface of each mesh of this surface net.

Object Density Determination

The derivation of a 2D cross-sectional shape from a set of tangent lines may introduce some errors in reproducing excrescences or indentations in the X/Y plane. Hence some of the multiple estimates of an object's X-ray specific density may be in error, due to incorrect assumptions of the relevant rays depth of penetration through one or more of the objects traversed.

We reduce this risk by choosing our sampling-ray positions to minimise the number of objects penetrated. Subject to this constraint, we seek a position as central as possible in the given projection of the object. We achieve this by shrinking the object's projected outline, normally to that outline, at a constant rate until it collapses into a single point within, or on the perimeter of, the sub-area of fewest overlaps. We perform this process separately for each object, in each of the 15 views. With the resultant 15 fold over sampling, we obtain 15 independent estimates of the density of each of our objects. As long as, say, a minimum of 4 of these give consistent results, we can safely assume that these do indeed represent the true specific density of the object (and of any other-objects penetrated by these sampling rays). We can disregard the (up to 11) other, mutually-inconsistent measurements as being evidently due to local imperfections in the 3D reconstruction of at least one of the objects penetrated by their sampling rays. If necessary, the number of density-sampling rays could easily be increased to whatever number is required to generate an unambiguous histogram distinguishing the consistent common value from the scattered false values.

We can then refine the estimate by averaging the consistent subset of data, weighting each by the ratio O/A, where O={aggregate density due to the relevant object}; A={aggregate density due to all objects penetrated by the given sampling ray}.

Thus good density estimate can be derived from a mediocre reconstruction of object shape.

The foregoing should cope very satisfactorily with solid objects. However, it is not adequate for the important special case of thin-sheet objects. Their outline will be well defined in 3D from even just 2 of our 15 source views. However, there is no practical way to measure their thickness with high fractional accuracy.

Thin-sheet objects are important, since explosive might be concealed in the lining of a suitcase. Fortunately, it seems improbably that a sheet of explosive would be so perfectly matched to the complete outline of the lining of one side of a suitcase that the X-ray system would not detect a separate edge from the explosive sheet. On the other hand since the thickness of this sheet could only be estimated within quite wide tolerances, its X-ray specific density would be somewhat indeterminate.

However, it might well be acceptable to operate an alarm when encountering:

a thin sheet, in (near) surface contact with a somewhat larger thin sheet (the "wall" of the case)

within the (somewhat wide) density bracket of potential sheet explosive.

Other means might then be involved to examine these rare suspect items.

Dual-Voltage Material Classification

We would also enhance the diagnostic capability of the routine screening system by the use of dual-voltage operation: The ratio of the "densities" of the same object, observed in the same ray path, at two distinct X-ray voltages, is independent of the assumed depth of penetration through that object, provided the same assumption is made for both voltages.

If we can assume that the side of the case which is "lined" with explosive is most likely to finish up horizontal on the conveyor system, we can limit the dual-voltage operation to the vertical "fan". It could be accomplished either by the provision of an additional vertical axis X/Y-plane fan, operating at the alternative voltage, or by time share switching of the given single source and sensor between the two modes.

If, however, we have to cater for vertical surfaces too, these can arise in any orientation. Assuming it is very unlikely that one side of a case will be accurately aligned with our X/Y plane, (where the path of near-tangential sampling rays might be too uncertain), it should (on the face of it) normally be sufficient to provide dual-voltage operation also for one source of near-horizontal (X-direction) viewing axis (in the X/Y plane).

Figure 9:
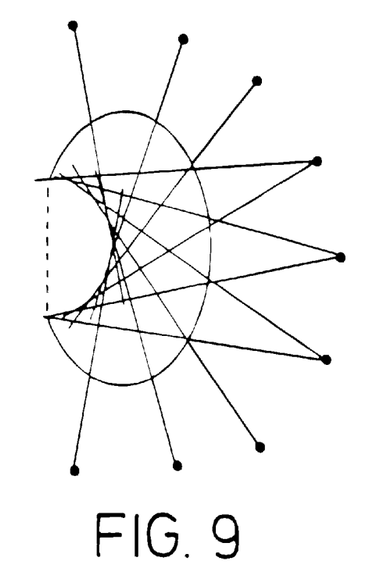
FIG. 9 shows tangent lines defining concavity within a reconstructed occluding outline.
Figure 10:
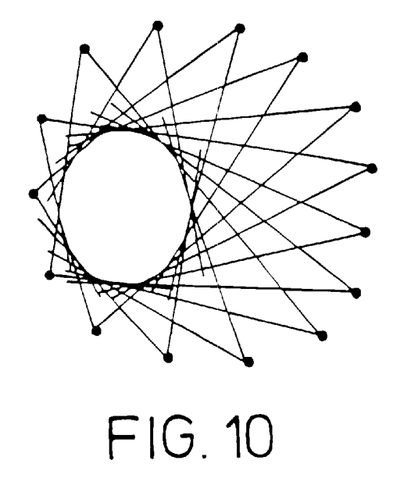
FIG. 10 shows non-uniform distribution of tangent lines for eccentrically-located object.
Figure 11:
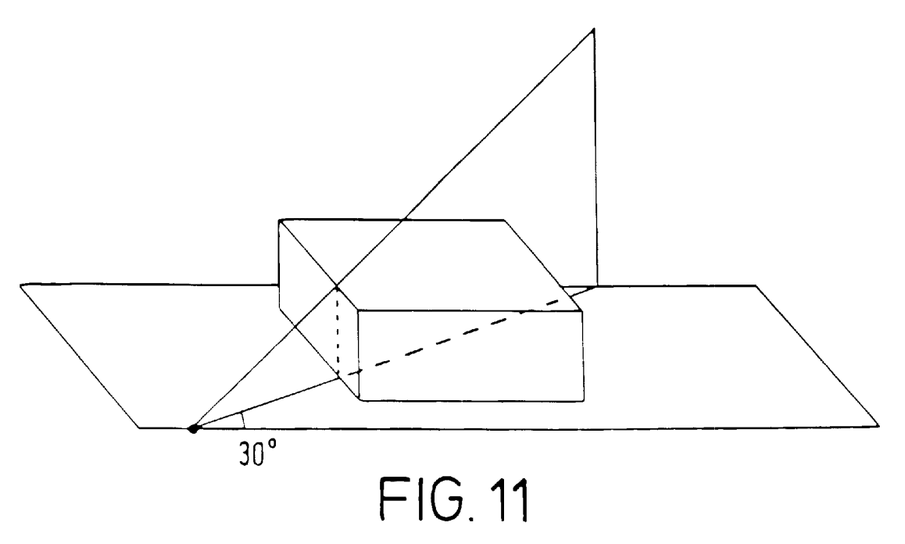
FIG. 11 shows an extra fan penetrating the constant-Z plane for the analysis of thin sheets in that plane.

If thin sheets fairly accurately aligned with the X/Y plane of the conveyor system are likely to be a significant problem, we might have to provide one additional (16th) horizontal axis, vertical-plane fan at, say, at 60° to the Z axis (the conveyor's direction of travel) and make this yet a further instance of dual voltage operation. See FIG. 9.

When (as usual) multiple objects overlap, we must derive the two distinct specific densities (for the two voltages) for all the overlapping objects, and hence we must ensure (as mentioned above) that our sampling rays are ones giving consistent results. With only two or three dual-voltage fans, it may not be possible to guarantee this process.

Benefitting from the 3D shape information derived from the full set of 15 (or 16) sensors, it should however be possible to define suitable density-sampling rays within the view of the central sources of our 5 triplets, thus restricting dual-voltage operation to these 5 sources and sensors and to the special one at 60° to the Z axis, if used.

The dual-voltage technique for material classification from the ratio of the dual-voltage "specific densities" could then of course be used for all objects. The basic system of, say, 15 single voltage fans would then still be required for the identification and shape reconstruction of objects. However, the accuracy specification for the reconstruction of the shapes of these objects could then be further relaxed. Conclusions A scheme based on object-3D, although performance-wise "ideal", would be too large and too expensive to constitute an optimum solution to this problem.

A system based on CT could meet the required throughput rate only if it took the form of the novel, multiple fixed-sensor configuration here proposed. However, it would then be too large and too expensive, and involve too high a radiation dosage to constitute an acceptable solution.

The alternative here proposed is based on an adaptation of the sources and sensors already in use for the screening of cabin luggage, but uses these in substantially larger numbers.

The solution is compatible with existing conveyor systems—provided only that the relevant section of the belt is reasonably transparent to X-rays. (Its residual signal can be noted and subtracted from the observed images).

The space requirement is fairly modest, and so should be acceptable to the user;

We can exploit the fact that we merely seek to classify the material of which objects are made, rather than to reconstruct their shape with very high precision, to achieve significant simplifications in information collection and in signal and data processing.

The presence of suspect thin sheets can be detected and indicated by an alarm.

If required, however, thin sheets, or indeed all objects, can be classified by dual voltage operation.

If single voltage operation is acceptable, there would be 15 fan-beam sources and line arrays.

If we include dual-voltage operation this would probably be restricted to 5 of the 15 fans, together, possible, with a special fan oriented at, say, 60° to the X and Z axes.

It seems likely that the proposed system could be produced commercially within acceptable cost limits.

The system would probably be film-safe.

In at least preferred embodiments of the invention, the luggage to be screened is carried on a conveyor system referred to as a tunnel. On the outside of this tunnel, at various positions along its length and around its cross-section, are placed sources of penetrating radiation. The radiation from each source crosses the tunnel and is detected by a sensor array on the opposite side of the tunnel, but not necessarily at the same axial position along the tunnel. In some circumstances, several sources may make use of part or all of a common sensor array on a time sharing basis. The radiation from each source is constrained to a sheet or fan, intersecting part or all of the cross-section of the tunnel, so that the corresponding sensor can be restricted to a line array rather than an area array. The passage of the luggage through such a sheet or a fan of radiation produces information in the relevant sensor which can be converted into a projected image. Within this image, each object or identifiable part of an object is identified by its outline and its aggregate opacity profile for the given type or types of penetrating radiation. The specific opacity of an object or any desired part of an object can also be derived from this data. All of the foregoing information can then be checked against various decision criteria.

What is claimed is:

1. Apparatus for screening an item to detect regions within said item having different opacity to radiation, said apparatus comprising:

a conveyor system for carrying said item along a path; and
   an array of sensors, each sensor comprising a radiation source (SO1,SO2,SO3) and a radiation detector (SE1, SE2,SE3) disposed upon opposite sides of said path and serving to generate transmission signals indicative of opacity to radiation between said radiation source and said radiation detector in a plane intersecting said path, said sensors being disposed at a plurality of different locations along said path and being arranged to irradiate said item from a plurality of different angular orientations about said path; characterised by
   a signal processor for processing said transmission signals from said array of sensors to detect contours of maximum local rate of change in opacity within a plane through said item to generate cross section signals indicative any boundaries in said plane between said regions having different opacity to radiation and responsive to said cross section signals for a plurality of planes through a region to detect if said region matches one or more predetermined screening criteria.

2. Apparatus as claimed in claim 1, wherein said predetermined screening criteria is whether said regions is of material having an opacity to radiation with a predetermined characteristic, said signal processor using said cross section signals in combination with said transmission signals to determine said opacity to radiation of said region.

3. Apparatus as claimed in claim 2, wherein said predetermined characteristic is an opacity falling within a predetermined range of opacities.

4. Apparatus as claimed in claim 2, wherein at least one of said radiation sources generates radiation at at least two frequencies and said predetermined characteristic is a relative opacity at said at least two frequencies of said radiation falling within a predetermined range of relative opacities.

5. Apparatus as claimed in claim 2, wherein said signal processor performs a determination process comprising using said cross section signals to determine a penetration distance within said region for radiation following a given line through said region and then using a transmission signal corresponding said radiation following said given line and said determined penetration depth to determine opacity to said radiation of material forming said region.

6. Apparatus as claimed in claim 5, wherein said signal processor performs a plurality of said determination processes corresponding to different given lines through said region to yield a set of a plurality of values for said opacity to said radiation of material forming said region and then selects a subset of values from within said set that are close in value to one another, values from said subset being averaged to yield a value upon which screen is based.

7. Apparatus as claimed in claim 1, wherein said conveyor system moves said item at a known rate along said path and said sensors disposed at a plurality of different locations along said path are controlled to generate respective transmission signals at times such that said transmission signals may be processed as a plurality of groups of transmission signals, each group of transmission signals corresponding to one of said plurality of planes through said item.

8. Apparatus as claimed in claim 1, wherein said plurality of planes are orthogonal to said path of said item along said conveyor system.

9. Apparatus as claimed in claim 8, comprising at least two additional sensors disposed to irradiate said item in a plane non-orthogonal to said path of said item along said conveyor system.

10. Apparatus as claimed in claim 1, wherein said conveyor system comprises a plurality of rollers and said sensors are disposed between said rollers.

11. Apparatus as claimed in claim 1, wherein said item is an item of aircraft-hold luggage.

12. Apparatus as claimed in claim 1, wherein said predetermined screen criteria is indicative of said region comprising an explosive.

13. Apparatus as claimed in claim 1, wherein said radiation comprises X-ray radiation.

14. Apparatus as claimed in claim 1, wherein said radiation detector comprises a line detector.

15. A method of screening an item to detect regions within said item having different opacity to radiation, said method comprising the steps of:

carrying said item along a path; and
   generating transmission signals with an array of sensors, each sensor comprising a radiation source and a radiation detector disposed upon opposite sides of said path and serving to generate transmission signals indicative of opacity to radiation between said radiation source and said radiation detector in a plane intersecting said path, said sensors being disposed at a plurality of different locations along said path and being arranged to irradiate said item from a plurality of different angular orientations about said path; characterised by processing said transmission signals from said array of sensors to detect contours of maximum local rate of change in opacity within a plane through said item to generate cross section signals indicative any boundaries in said plane between said regions having different opacity to radiation and responsive to said cross section signals for a plurality of planes through a region to detect if said region matches one or more predetermined screening criteria.

* * * * *